United States Patent
Sullivan et al.

(10) Patent No.: US 7,917,346 B2
(45) Date of Patent: Mar. 29, 2011

(54) GEOSPATIAL MODELING SYSTEM PROVIDING SIMULATED TREE TRUNKS AND BRANCHES FOR GROUPS OF TREE CROWN VEGETATION POINTS AND RELATED METHODS

(75) Inventors: John Sullivan, Indialantic, FL (US); Harlan Yates, Melbourne, FL (US); Mark Rahmes, Melbourne, FL (US); Timothy B. Faulkner, Palm Bay, FL (US); Brian Hicks, Palm Bay, FL (US)

(73) Assignee: Harris Corporation, Melbourne, FL (US)

( * ) Notice: Subject to any disclaimer, the term of this patent is extended or adjusted under 35 U.S.C. 154(b) by 480 days.

(21) Appl. No.: 12/033,133

(22) Filed: Feb. 19, 2008

(65) Prior Publication Data

US 2009/0210205 A1  Aug. 20, 2009

(51) Int. Cl.
 *G06F 9/455* (2006.01)
(52) U.S. Cl. ............... 703/11; 703/2; 382/108
(58) Field of Classification Search ............... 703/6, 11, 703/2; 342/54; 382/110, 109, 284; 702/155, 702/190, 5; 345/427, 630
See application file for complete search history.

(56) References Cited

U.S. PATENT DOCUMENTS

| | | | | |
|---|---|---|---|---|
| 6,654,690 | B2 | 11/2003 | Rahmes et al. | 702/5 |
| 7,187,452 | B2 | 3/2007 | Jupp et al. | 356/501 |
| 7,292,941 | B1 * | 11/2007 | Rahmes et al. | 702/5 |
| 7,760,913 | B2 * | 7/2010 | Rahmes et al. | 382/109 |
| 2004/0236535 | A1 * | 11/2004 | Hyyppa et al. | 702/155 |
| 2005/0117215 | A1 | 6/2005 | Lange | 359/462 |
| 2006/0125680 | A1 * | 6/2006 | Thackray | 342/54 |
| 2007/0265781 | A1 * | 11/2007 | Nemethy et al. | 702/5 |
| 2007/0291994 | A1 * | 12/2007 | Kelle et al. | 382/110 |
| 2008/0040076 | A1 * | 2/2008 | Rahmes et al. | 702/190 |
| 2008/0040349 | A1 * | 2/2008 | Rahmes et al. | 707/7 |
| 2008/0133195 | A1 * | 6/2008 | Rahmes et al. | 703/11 |
| 2008/0273759 | A1 * | 11/2008 | Rahmes et al. | 382/109 |
| 2008/0285885 | A1 * | 11/2008 | Rahmes et al. | 382/284 |
| 2008/0319723 | A1 * | 12/2008 | Smith et al. | 703/2 |
| 2010/0118053 | A1 * | 5/2010 | Karp et al. | 345/630 |
| 2010/0182316 | A1 * | 7/2010 | Akbari et al. | 345/427 |

OTHER PUBLICATIONS

Pyysalo et al., *Reconstructing Tree Crowns from Laser Scanner Data for Feature Extraction*, ISPRS Commission III, Symposium 2002 Sep. 9-13, 2002, Graz, Austria, pp. B-218 ff (4 pages).

Popescu, *Measuring Individual Tree Crown Diameter With Lidar and Assessing its Influence on Esitmating Forest Volume and Biomass*, International Archives of Photogrammetry, Remote Sensing and Spatial Information Sciences, vol. XXXVI-8/W2 influence on estimating forest volume and biomass, In: ScandLaser Proceedings, pp. 125-133.

(Continued)

*Primary Examiner* — Kandasamy Thangavelu
(74) *Attorney, Agent, or Firm* — Allen, Dyer, Doppelt, Milbrath & Gilchrist, P.A.

(57) ABSTRACT

A geospatial modeling system may include a geospatial model data storage device containing geospatial model data including a plurality of groups of tree crown vegetation points and a display. The system may further include a processor cooperating with the geospatial model data storage device and the display for displaying a simulated tree trunk beneath a group of tree crown vegetation points, and displaying at least one level of simulated tree branches for the simulated tree trunk. Each tree branch may be positioned based upon determining a branch distal reference point beneath a cluster of tree crown vegetation points from among the group of tree crown vegetation points.

29 Claims, 12 Drawing Sheets

OTHER PUBLICATIONS

Haala et al., *Combination of Terrestrial Laser Scanning with High Resolution Panoramic Images for Investigations in Forest Applications and Tree Species Recognition*, Proceedings of the ISPRS working group V/1, Panoramic Photogrammetry Workshop, vol. XXXIV, Part 5/W16, Dresden, Feb. 19-22.

Verdera et al., *Inpainting Surface Holes*, May 2, 2003.

Lee et al., *Quantifying Vertical Forest Stand Structure Using Small Footprint LIDAR to Assess Potential Stand Dynamics*, Proceedings of the ISPRS Working Group VIII/2 Laser-Scanners for Forest and Landscape Assessment Conference, Freiburg, Germany, Oct. 3-6, 2004.

Yu et al., *A GIS-based Forest Visual Simulation System*, Proceedings of the Third Conference on Image and Graphics, 2004 IEEE, pp. 410-413.

Pyysalo, *Single Tree Feature Extraction from Airborne Laser Scanner Data applying Vector Models*, Thesis for degree of Licentiate of Science In Technology Submitted to the Department of Surveying at Helsinki University of Technology, Aug. 2006.

Pfeifer et al., "Automatic Reconstruction of Single Trees from Terrestrial Laser Scanner Data", Proc. SPRS XXTH Congress, Jul. 12, 2004, p. 114.

Tan et al., "Image-Based Tree Modeling", ACM Transactions on Graphics, vol. 26, No. 3, Jul. 29, 2007, pp. 87-1-87-7.

Xu et al., "Knowledge and Heuristic-Based Modeling of Laser-scanned Trees", ACM Transactions on Graphics, vol. 26, No. 4, Oct. 2007, pp. 19-1-19-13.

Muhar, "Three-Dimensional Modelling and Visualisation for Vegetation for Landscape Simulation", Landscape and Urban Planning, vol. 54, No. 1-4, pp. 5-17.

\* cited by examiner

GEOSPATIAL MODELING SYSTEM PROVIDING SIMULATED TREE TRUNKS AND BRANCHES FOR GROUPS OF TREE CROWN VEGETATION POINTS AND RELATED METHODS

FIELD OF THE INVENTION

The present invention relates to the field of topographical modeling, and, more particularly, to geospatial modeling systems and related methods.

BACKGROUND OF THE INVENTION

Topographical models of geographical areas may be used for many applications. For example, topographical models may be used in flight simulators and for planning military missions. Furthermore, topographical models of man-made structures (e.g., cities) may be extremely helpful in applications such as cellular antenna placement, urban planning, disaster preparedness and analysis, and mapping, for example.

Various types and methods for making topographical models are presently being used. One common topographical model is the digital elevation map (DEM). A DEM is a sampled matrix representation of a geographical area which may be generated in an automated fashion by a computer. In a DEM, coordinate points are made to correspond with a height value. DEMs are typically used for modeling terrain where the transitions between different elevations (e.g., valleys, mountains, etc.) are generally smooth from one to a next. That is, DEMs typically model terrain as a plurality of curved surfaces and any discontinuities therebetween are thus "smoothed" over. Thus, in a typical DEM no distinct objects are present on the terrain.

One particularly advantageous 3D site modeling product is RealSite® from the present Assignee Harris Corp. RealSite® may be used to register overlapping images of a geographical area of interest, and extract high resolution DEMs using stereo and nadir view techniques. RealSite® provides a semi-automated process for making three-dimensional (3D) topographical models of geographical areas, including cities, that have accurate textures and structure boundaries. Moreover, RealSite® models are geospatially accurate. That is, the location of any given point within the model corresponds to an actual location in the geographical area with very high accuracy. The data used to generate RealSite® models may include aerial and satellite photography, electro-optical, infrared, and light detection and ranging (LIDAR). Another similar system from Harris Corp. is LiteSite®. LiteSite® models provide automatic extraction of ground, foliage, and urban digital elevation models (DEMs) from LIDAR and IFSAR imagery. LiteSite™ can be used to produce affordable, geospatially accurate, high-resolution 3-D models of buildings and terrain.

Another advantageous approach for generating 3D site models is set forth in U.S. Pat. No. 6,654,690 to Rahmes et al., which is also assigned to the present Assignee and is hereby incorporated herein in its entirety by reference. This patent discloses an automated method for making a topographical model of an area including terrain and buildings thereon based upon randomly spaced data of elevation versus position. The method includes processing the randomly spaced data to generate gridded data of elevation versus position conforming to a predetermined position grid, processing the gridded data to distinguish building data from terrain data, and performing polygon extraction for the building data to make the topographical model of the area including terrain and buildings thereon.

One difficulty in generating automated topographical models is generating realistic looking foliage, and particularly trees. This is because geospatial modeling data is often captured from above the geographical area of interest from an airplane or satellite, and thus the raw image data may not include data points corresponding to the trunks of trees, only the leaves/needles thereon. Thus, when a three-dimensional (3D) digital elevation model (DEM) of the scene is generated, it may only include the crowns of trees and not the trunks.

Various approaches have been used for attempting to determine the location and heights of tree trunks from collected image data. For example, in an article by Pyysalo et al. entitled "Reconstructing Tree Crowns from Laser Scanner Data for Feature Extraction," ISPRS Commission III, Symposium 2002 Sep. 9-13, 2002, Graz, Austria, 2002, a study to reconstruct single tree crowns from laser scanner data to use the obtained vector model for feature extraction is described. As part of the reconstruction methodology, an estimate of the location of the tree trunk was calculated from crown points as a mean value of x and y coordinates weighted with point height. The tree trunks were considered as straight lines from the top of the tree to the surface of the digital terrain model. This reference line was then used to help estimate an average distance of points from the trunk at different heights.

Another approach is described in a paper by Yu et al. entitled "A GIS-based Forest Visual Simulation System," Proceedings of the Third Int'l Conf. on Image and Graphics, IEEE, 2004. This paper reports on a visual simulation system that supports GIS-based modeling and real-time rendering of forest scenes. The system uses geometric models or templates of trees that are automatically generated according to inventory database and pre-designed template models. Some similar approaches use stand-in templates that are manually drawn (i.e., "billboards") that are layered in a 3D model to provide the appearance of a forest.

Despite the existence of such approaches, further techniques may be desirable for simulating realistic tree structure, including trunks and branches, in 3D geospatial models. In particular, it may be desirable to provide realistic representations of actual trees as they would appear in a geospatial scene to preserve spatial relationships and accuracy in a corresponding geospatial model.

SUMMARY OF THE INVENTION

In view of the foregoing background, it is therefore an object of the present invention to provide a system and related methods for generating and displaying simulated tree trunks and branches for respective groups of tree crown vegetation points from geospatial model data.

This and other objects, features, and advantages are provided by a geospatial modeling system which may include a geospatial model data storage device containing geospatial model data including a plurality of groups of tree crown vegetation points and a display. The system may further include a processor cooperating with the geospatial model data storage device and the display for displaying a simulated tree trunk beneath a group of tree crown vegetation points, and displaying at least one level of simulated tree branches for the simulated tree trunk. Moreover, each tree branch may be positioned based upon determining a branch distal reference point beneath a cluster of tree crown vegetation points from among the group of tree crown vegetation points. Accordingly, the system may advantageously provide relatively realistic representations of actual trees as they would appear in a geospatial scene to preserve spatial relationships and accuracy in a corresponding geospatial model.

More particularly, the processor may further determine the branch distal reference points by dividing the group of tree crown vegetation points into a plurality of adjacent clusters of tree crown vegetation points. For example, the processor may determine the branch distal reference points based upon calculating a centroid for each cluster of tree crown vegetation points. The processor may determine the branch distal reference points as upper branch endpoints. Furthermore, the processor may further determine branch proximal reference points based upon one of a preceding level and the simulated tree trunk, and the processor may determine the branch proximal reference points as lower branch endpoints.

Additionally, the processor may be for displaying a plurality of vertically arranged levels of simulated tree branches. Also, the processor may further determine a tree type for the group of tree crown vegetation points from among a plurality of different tree types, and the processor may display the at least one level of simulated tree branches based upon the tree type. The processor may also display vegetation texture at endpoints of the simulated tree branches.

Further, the processor may display the simulated tree trunk to have a tree trunk height based upon heights of the group of tree crown vegetation points. By way of example, the processor may determine the tree trunk height by calculating a midpoint between ground and the group of tree crown vegetation points. The geospatial model data may include three-dimensional (3D) digital elevation model (DEM) data, for example.

A related computer-readable medium and geospatial modeling method are also provided. The method may include providing geospatial model data including a plurality of groups of tree crown vegetation points, and displaying a simulated tree trunk beneath a group of tree crown vegetation points on a display. The method may further include displaying at least one level of simulated tree branches for the simulated tree trunk on the display. Each tree branch may be positioned based upon determining a branch distal reference point beneath a cluster of tree crown vegetation points from among the group of tree crown vegetation points.

DETAILED DESCRIPTION OF THE PREFERRED EMBODIMENTS

The present invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternate embodiments.

Figure 1:
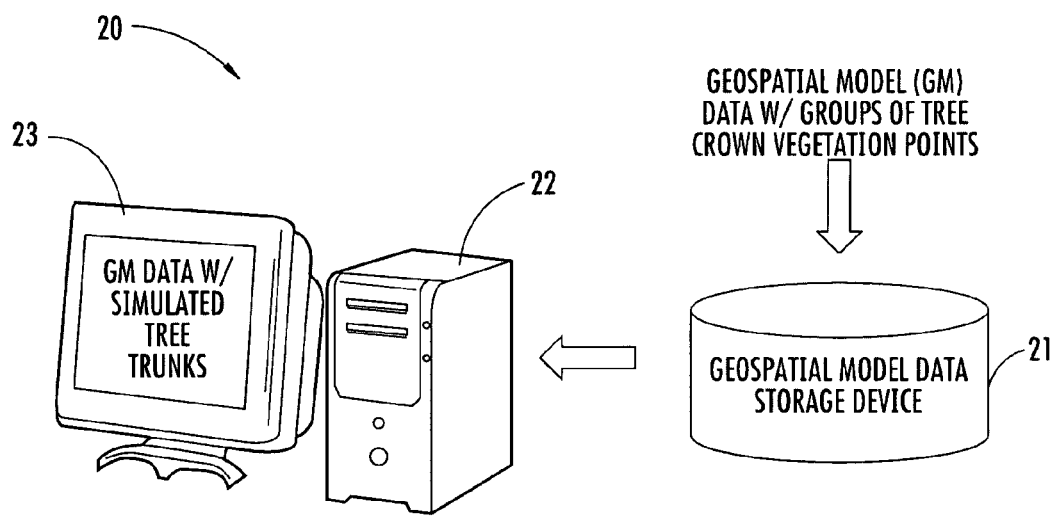
FIG. 1 is a schematic block diagram of a geospatial modeling system in accordance with the invention.
Figure 2:
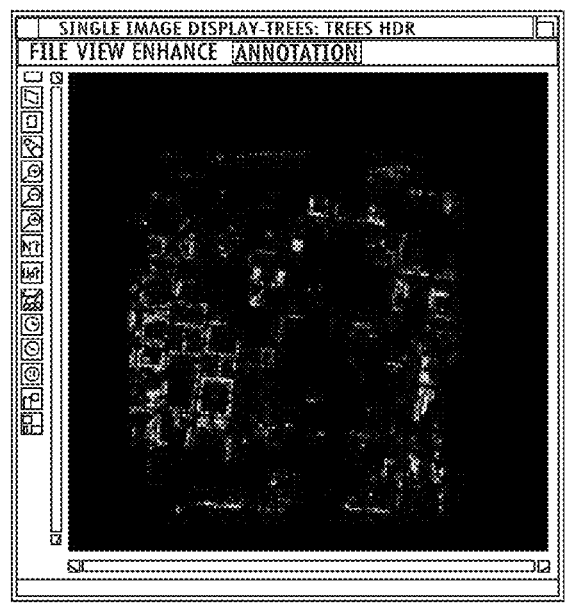
FIGS. 2 and 3 are, respectively, screen prints of geospatial image data before and after performing a windowing operation to determine tree trunk locations in accordance with the invention.

Referring initially to FIG. 1, a geospatial modeling system 20 illustratively includes a geospatial model data storage device 21 and a processor 22 that may advantageously be used for generating and displaying simulated tree trunks for groups of tree crown vegetation points from geospatial model data contained in the geospatial model data storage device. By way of example, the processor 22 may be a central processing unit (CPU) of a PC, Mac, or other computing workstation, for example. A display 23 may also be coupled to the processor 22 for displaying geospatial modeling data, as will be discussed further below. The processor 22 may be implemented using a combination of hardware and software components/modules to perform the various operations that will be discussed further below, as will be appreciated by those skilled in the art.

By way of example, geospatial data may be captured using various techniques such as stereo optical imagery, Light Detecting and Ranging (LIDAR), Interferometric Synthetic Aperture Radar (IFSAR), etc. Generally speaking, the data will be captured from overhead (e.g., nadir) views of the geographical area of interest by airplanes, satellites, etc., as will be appreciated by those skilled in the art. However, oblique images of a geographical area of interest may also be used in addition to (or instead of) the nadir images in some embodiments to add additional 3D detail to a geospatial model. The raw image data captured using LIDAR, etc., may be processed upstream from the geospatial model data storage device 21 into a desired format, such as a digital elevation model (DEM), or this may be done by the processor 22.

Turning additionally to FIGS. 2 through 10, a geospatial modeling approach which may advantageously be used for generating and displaying simulated tree trunks, for example, using the system 20 is now described. Beginning at Block 100, geospatial model data, such as 3D DEM data, for example, is stored in the geospatial model data storage device 21, at Block 102. Generally speaking, the geospatial model data will include "raw" data points collected by LIDAR, etc., that have position and elevation information association therewith that is geo-referenced to a corresponding geospatial position grid to provide the DEM. In certain embodiments, additional refinements to the DEM data may be performed, such as edge detection to sharpen building boundaries, texturing, etc., using tools such as RealSite® and the system set forth in U.S. Pat. No. 6,654,690, as discussed further above and will be appreciated by those skilled in the art.

Figure 3:
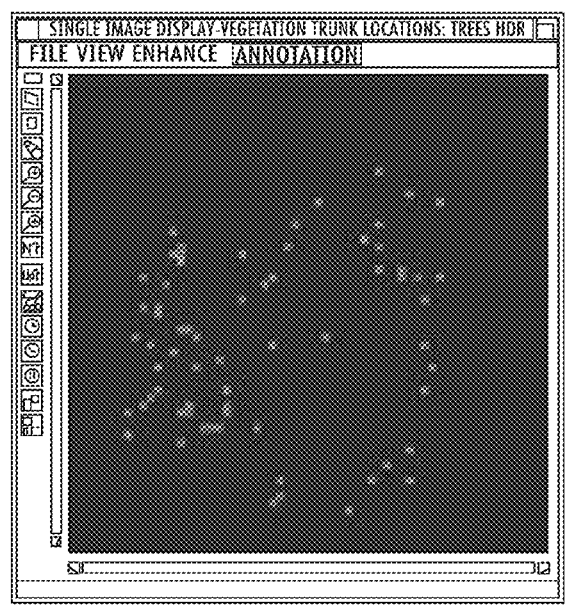
Figure 4:
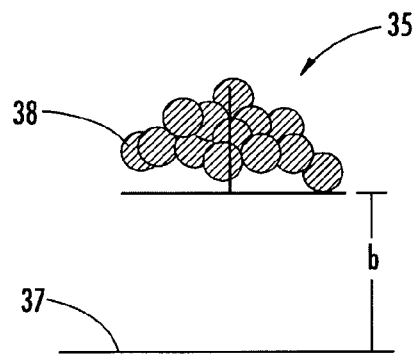
FIGS. 4 through 7 are schematic views illustrating generation of simulated tree trunk bodies in accordance with the invention.
Figure 5:
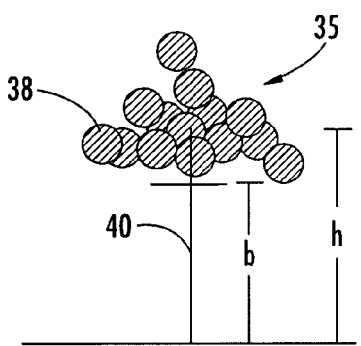
Figure 6:
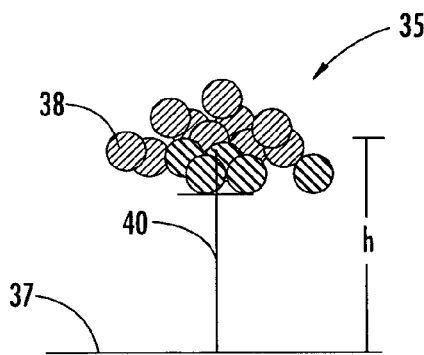
Figure 7:
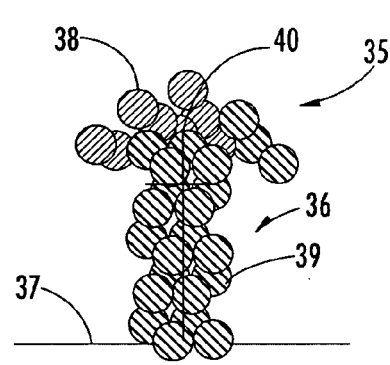

The processor 22 may then determine respective groups of tree crown vegetation points 35 for trees within the geospatial model data 30 based upon applying a peak-finding window, for example, at Block 102. More particularly, for each data point or post, the processor 22 compares the heights of adjacent posts within a predetermined window to find which vegetation (i.e., leaves/needles) points belong within a same group, and which point(s) within a respective group has the highest elevation, as will be appreciated by those skilled in the art. The highest point will correspond to the location of a trunk 36 for the tree that is represented by the tree crown vegetation points 35 (FIG. 7). Vegetation data 31 is thereby separated into contiguous block and matched with the trunk points, as seen in FIG. 3.

The vegetation data may be distinguished from other data, such as ground or building data, based upon a color of the collected data, where a color image collector is used, or by using other techniques known to those skilled in the art. By way of example, one particularly advantageous technique for distinguishing vegetation and cultural (e.g., building) features from ground in a DEM is set forth in the co-pending U.S. patent application Ser. No. 11/463,353, which is also assigned to the present Assignee and is hereby incorporated herein in its entirety by reference.

The processor 22 then determines or sets a height h for each tree trunk 36 for each group of tree crown vegetation points 35, at Block 103. More particularly, the processor 22 generates each simulated tree trunk 36 to have a tree trunk height h based upon heights of the respective group of tree crown vegetation points. For example, the processor 22 may set the tree trunk 36 height h above ground 37 to an average height of the respective group of tree crown vegetation points 35 above ground.

To determine the average height h, the processor 22 may first determine a base height b, which corresponds to the base or bottom of the group of tree crown vegetation points 25 relative to the ground 37. The average height is then half-way between the base height b and the peak height of the group of tree crown vegetation points 25. The base height b may be determined based upon one or more outlying points on the edge of the group of tree crown vegetation points 25, as the image collector which captures the raw image data may not have a line of sight to vegetation points on the bottom of the middle of a tree, as will be appreciated by those skilled in the art. By making the height h of the trunk 36 an average height of the group of tree crown vegetation points 25, this advantageously makes the trunk extend into the vegetation of the tree, but remain below the top of the crown, as an actual tree trunk would appear. This adds to the realistic nature of the simulated tree trunk 36.

The processor 22 further sets the tree trunk 36 width based upon a width of the respective group of tree crown vegetation points 35, at Block 104. By way of example, this may be done as a predetermined proportion of a tree crown width. That is, the processor determines the width of a respective group of tree crown vegetation points 25 and sets the trunk width in proportion to a percentage of the crown width. Alternatively, the width of the tree trunk may simply be set to a fixed value. Other suitable approaches may also be used for setting the width of the tree trunk 36.

Once the location, height, and width of the tree trunk 36 are determined, the processor 22 may then generate and display a simulated tree trunk with its respective group of tree crown vegetation points 35. In particular, each tree crown vegetation point may be displayed as a vegetation-colored body 38 at its associated geospatial position, at block 105. In the illustrated example, the vegetation colored bodies 38 are spheres, and they may be colored a shade of green, for example. Of course, other vegetation body shapes and colors may be used.

Figure 10:
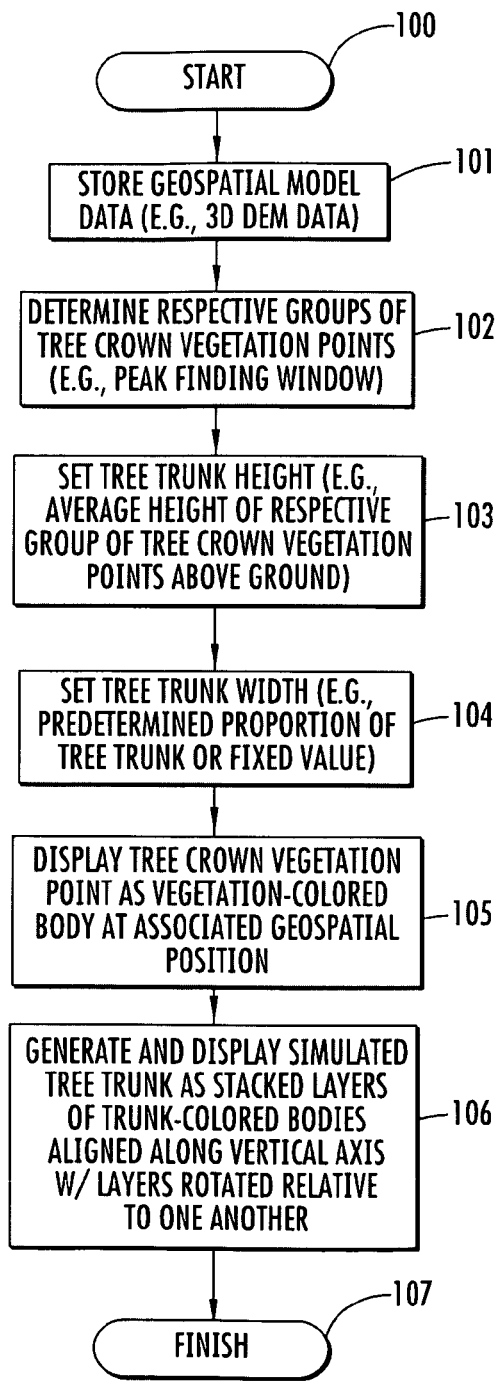
FIG. 10 is a flow diagram of a geospatial modeling method in accordance with the invention.
Figure 11:
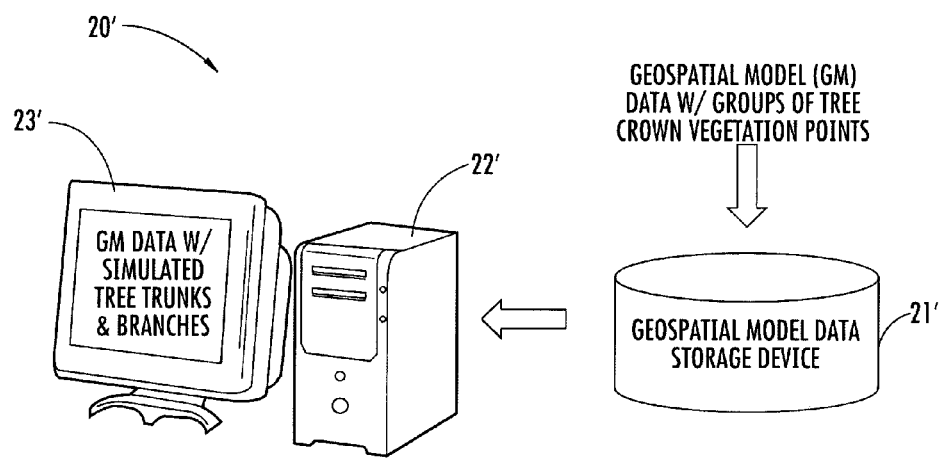
FIG. 11 is a schematic block diagram of an alternative geospatial modeling system in accordance with the invention providing tree and branch simulation.

Similarly, the processor 22 may also display the simulated tree trunk 36 as stacked layers of trunk-colored bodies 39 aligned along a vertical axis 40, at Block 106, thus concluding the method illustrated in FIG. 10 (Block 107). By way of example, the trunk-colored bodies may also be spheres, and they may be colored a shade of brown, for example, although other shapes/colors may also be used. To provide a still further realistic look to the simulated tree trunks 36, adjacent layers of the trunk-colored bodies 39 may be rotated relative to one another. This gives the simulated tree trunk 36 a helical or corkscrew shape that may appear more realistic in some 3D geospatial models, as opposed to merely inserting a solid 3D object in place of the trunk, such as a cylinder or 3D rectangle, for example. Of course, in certain embodiments solid objects, lines, etc., may be used for the simulated tree trunks 36.

Figure 8:
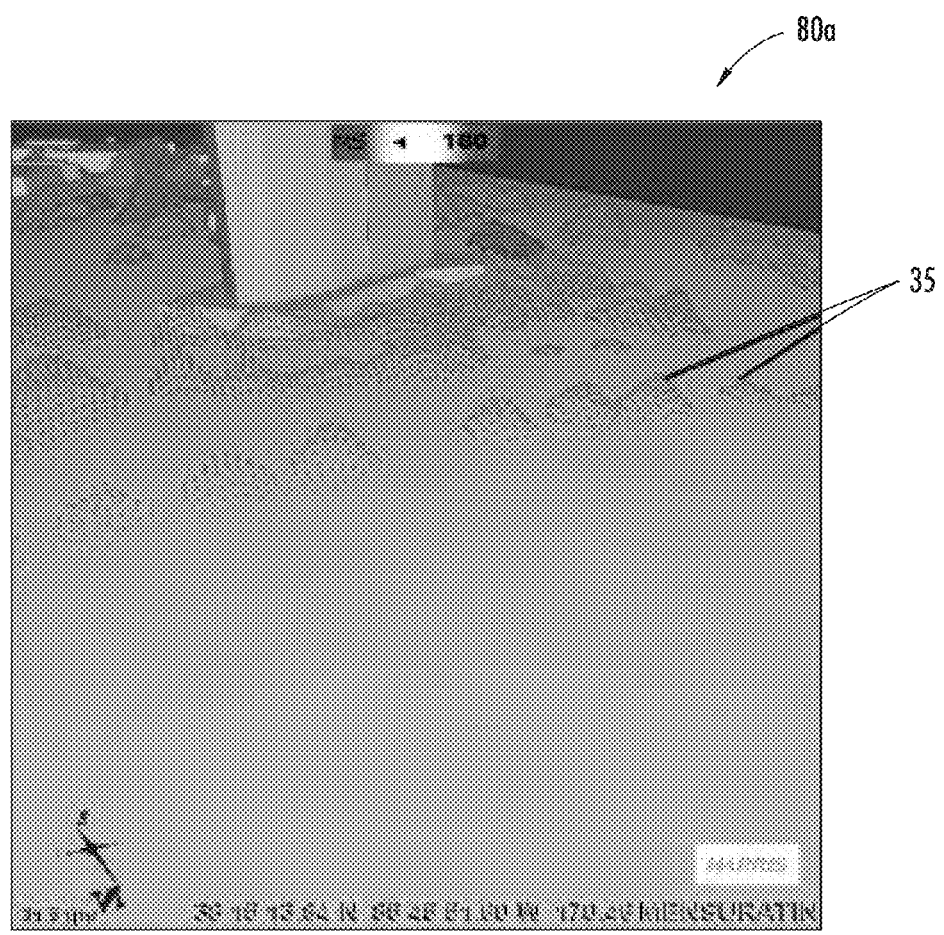
FIGS. 8 are 9 are, respectively, digital elevation model views before and after generating and displaying simulated tree trunks in accordance with the invention.
Figure 9:
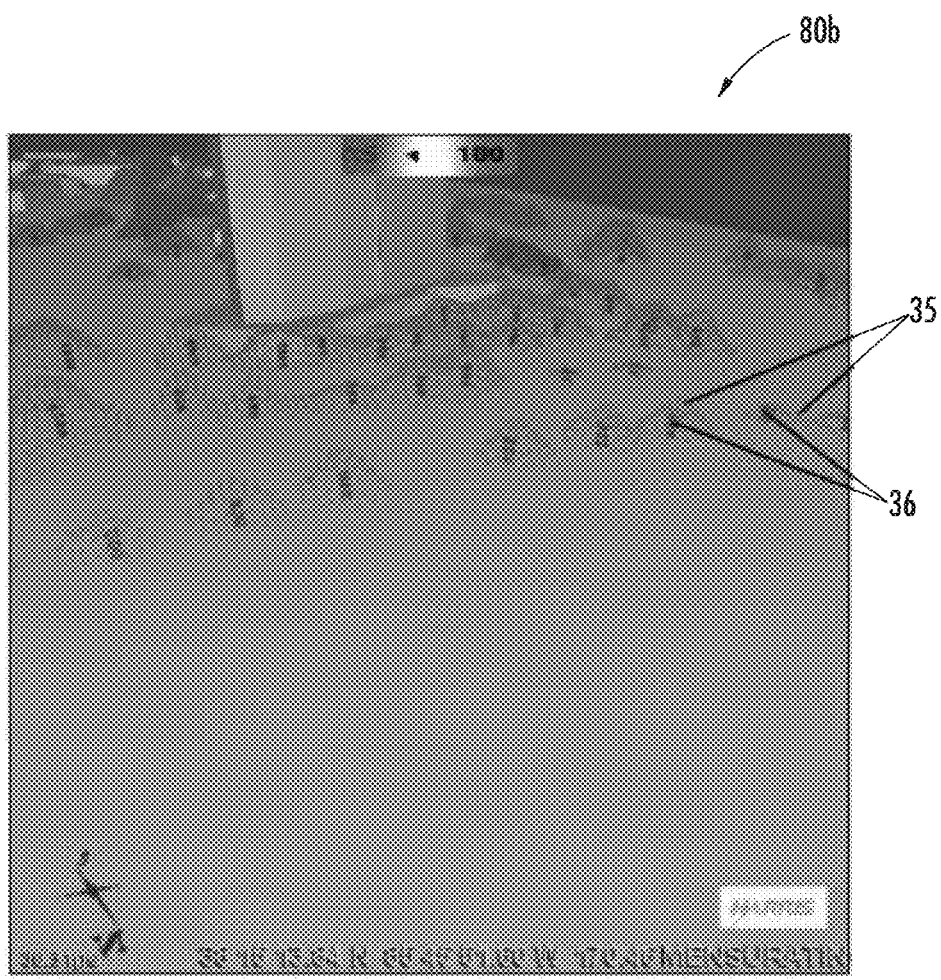

An exemplary display view of a DEM 80a including groups of tree crown vegetation points 35 without simulated tree trunks 36 is shown in FIG. 8, while the same DEM 80b including respective simulated tree trunks for the groups of tree crown vegetation points is shown in FIG. 9. As may be seen, the simulated trunks help a viewer to more readily identify the vegetation points 35 as tree vegetation, as opposed to bushes, etc. Moreover, the helical or "corkscrew" shape of the simulated tree trunks 36 helps prevent an unnatural "stilted" look of the trees.

Turning additionally to FIGS. 11-16, an alternative embodiment of the system 30' which advantageously provides simulated tree trunks and branches is now described. That is, the system 30' may advantageously extend aspects of the tree trunk simulation approach described above to also simulate interior branch structures of trees. Generally speaking, beginning at Block 150, the processor 22' cooperates with the geospatial model data storage device 21' and the display 23' for displaying a simulated tree trunk 36' beneath a group of tree crown vegetation points 35', at Block 151. Moreover, the processor 22' further displays one or more levels of simulated tree branches 122' for the simulated tree trunk 36', where each tree branch is positioned based upon determining a branch distal reference point 123 beneath a cluster of tree crown vegetation points from among the group of tree crown vegetation points 35', as will be discussed further below, at Blocks 152-153, thus concluding the method illustrated in FIG. 15.

Figure 16:
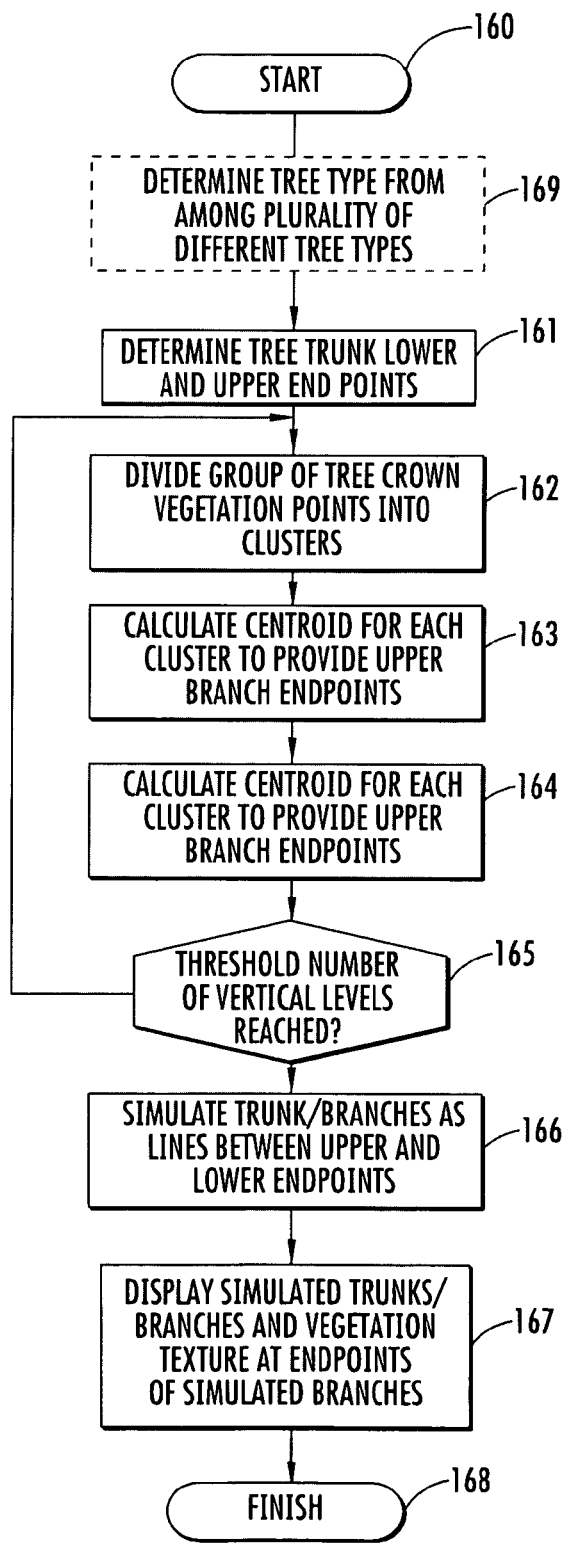

Turning now more specifically to FIG. 16, for a vegetation point cloud corresponding to one or more trees, the processor 22' uses a crown detection approach such as the one described above (i.e., a peak finding window) to determine crowns, and therefore trunk locations, of individual trees. Each trunk 36' is associated with a respective group of tree crown vegetation points 35'. In a forest or stand of multiple trees, the group of tree crown vegetation points 35' is considered as a subset of the overall vegetation point cloud.

Beginning at Block 160, the processor 22' determines the height of a trunk 36' for a given tree based upon heights of the tree crown vegetation points 35' for the tree, e.g., by calculating a midpoint between ground 37' and the group of tree crown vegetation points. A point 120' where the trunk 36' intersects ground 37' becomes the lower end point for the trunk, and the midpoint 121' between ground and the group of tree crown vegetation points 35' becomes the upper end point for the trunk, at Block 161. The upper end point may be a half-way point in some embodiments, or it could be closer or farther away from the top of the tree crown in other embodiments. In the present embodiment, the trunk 36' is simulated by drawing a straight line between the lower end point 120' and the upper end point 121', although the helical/corkscrew shape described above (or other shapes) may also be used.

The processor 22' determines the branch distal reference points by dividing the group of tree crown vegetation points 35' into a plurality of adjacent clusters of tree crown vegetation points, at Block 162. Generally speaking, the branch simulation is a recursive or iterative approach that may be used to generate one or more vertical levels of branches 122', with each branch in the level extending into a respective one of the clusters of vegetation points. The number of clusters that the group of tree crown vegetation points 35' is divided into is adjustable based upon the given implementation.

In one embodiment, the group of tree crown vegetation points 35' may be divided into a predetermined number of clusters. In the example illustrated in FIGS. 12A-12D, a four-quadrant clustering approach is used, meaning that for each new level of branches 122' to be simulated the 360° area of vegetation points is divided into four 90° quadrants, with the points in each quadrant being considered a cluster of points. Thus, there will be four new branches generated for each level of branches 122'. However, it should be noted that other numbers of quadrants may be used in different embodiments. Moreover, a quadrant-based clustering scheme need not be used in all embodiments, and other suitable approaches that will be appreciated by those of skill in the art for clustering the vegetation points may also be used, such as clustering based upon vegetation point density, for example.

For the initial level of branches 122a', the processor 22' sets the proximal reference point for each of the branches as the upper end point of the trunk 36'. The processor 22' then determines the distal or upper end point for each branch in the level 122a'. In one embodiment, this may be done by calculating a centroid for each cluster of tree crown vegetation points, as will be appreciated by those skilled in the art, at Block 163. The upper end point may then be set as a mid point half-way along a line extending from the lower end point (the point 121' for the first level of branches 122a') that intersects the centroid, although points closer or farther away from the lower end point may also be used.

Once the lower and upper end points for each cluster are determined, the processor 22' may determine whether another level 122' of branches is to be simulated, i.e., whether a threshold number of branch levels has been reached, at Block 165. That is, the above-described branch level simulation steps may be recursively or iteratively applied to simulate additional levels of branches 122b', 122c', etc. In the illustrated embodiment, the predetermined threshold number of vertical levels of branches is set to three, although more or less numbers of branch levels may be used. Moreover, the number of branch levels need not be predetermined in all embodiments. That is, the processor 22' may continue generating additional levels of branches 122' until a density of subsequent point clusters becomes relatively small (i.e., falls below a vegetation point density threshold). Stated alternatively, the recursion may continue until the number of points in a cluster is too small to include a branch, as will be appreciated by those skilled in the art.

It should be noted that for the second and third levels of branches 122b', 122c', the proximal or lower end point is set to the upper end point for the preceding branch level. That is, the lower end points for the branches of the level 122b' are the upper end points for the branches of the level 122a', and the lower end points for the branches of the level 122c' are the upper end points for the branches of the level 122b', as will also be appreciated by those skilled in the art. However, this need not be the case in all embodiments. That is, the lower end point for a given level of branches 122' could start below (or above) the upper end point for the trunk 36' or preceding level of branches, for example.

Figure 12A:
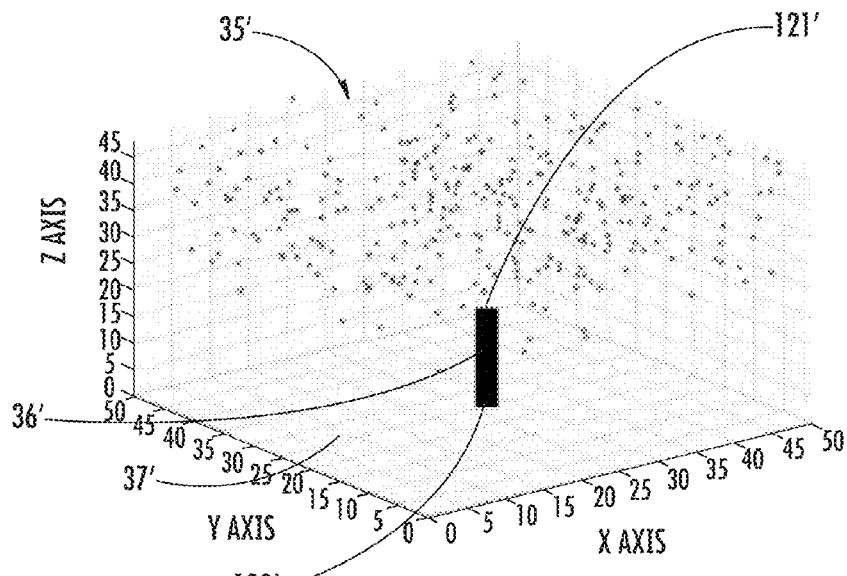
FIGS. 12A-12D are a series of 3D tree renderings illustrating different levels of trunk and branch simulation by the system of FIG. 11.
Figure 12B:
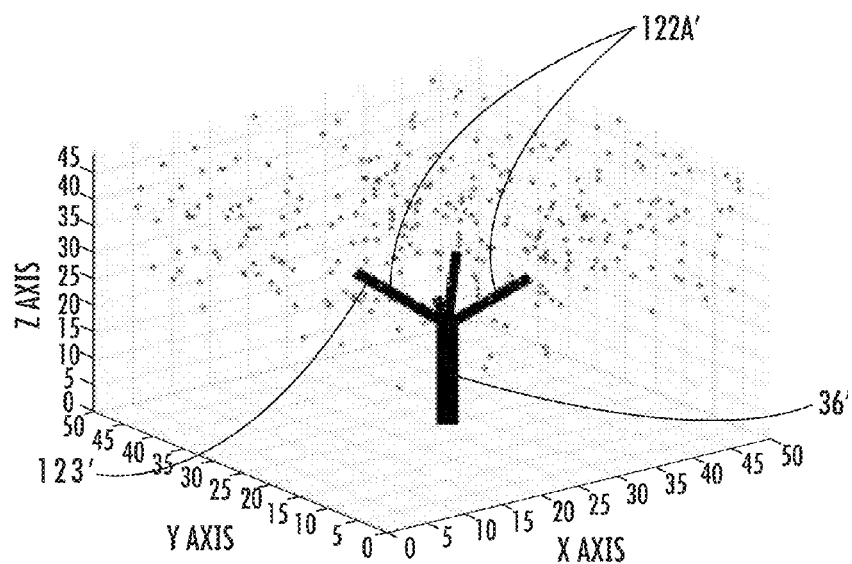
Figure 12C:
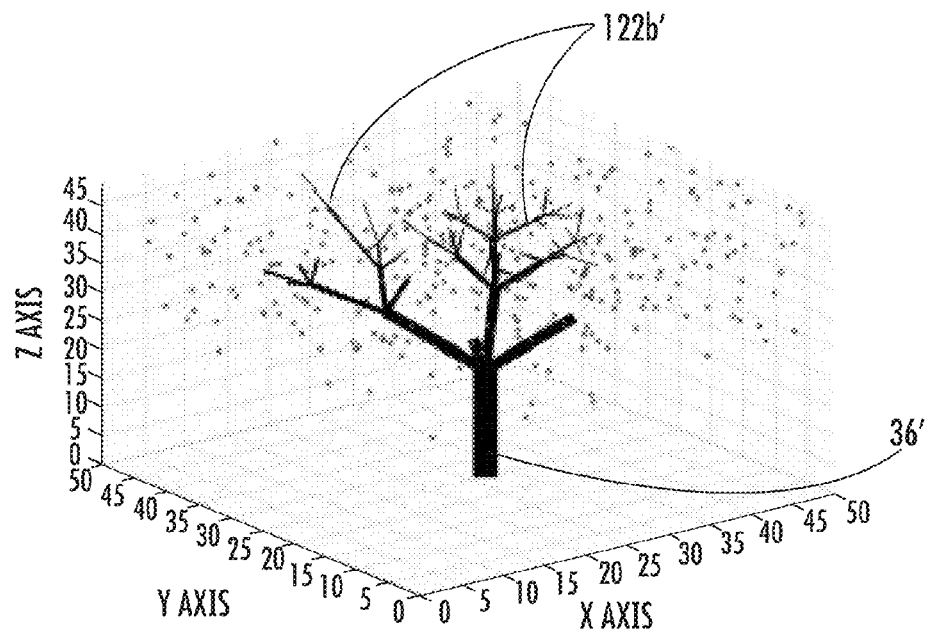
Figure 12D:
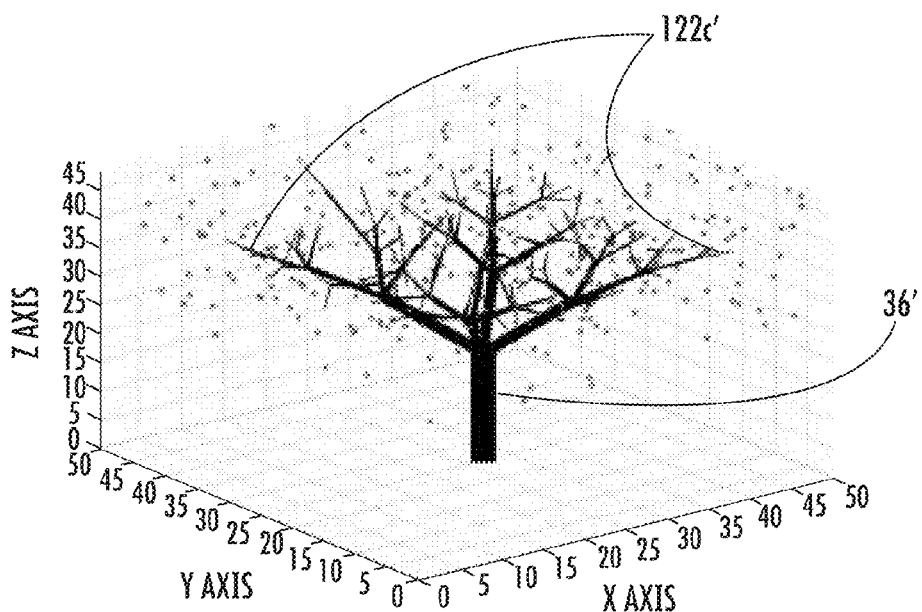

Once the processor 22' has determined all of the upper and lower endpoints for the trunk 36' and levels of tree branches 122', the processor may then simulate and display the trunk and branches as lines, etc., extending between the upper and lower end points, at Blocks 166-167, as shown in FIG. 12D. It may also be desirable to vary the widths of the trunk and branches through subsequent recursions or iterations to give a more natural look, and shown in the artist representations of FIGS. 12A-12D. That is, the trunk 35' is thicker than the branches of the first level 122a', the branches of the first level are thicker than the branches of the second level 122b', etc.

Figure 13:
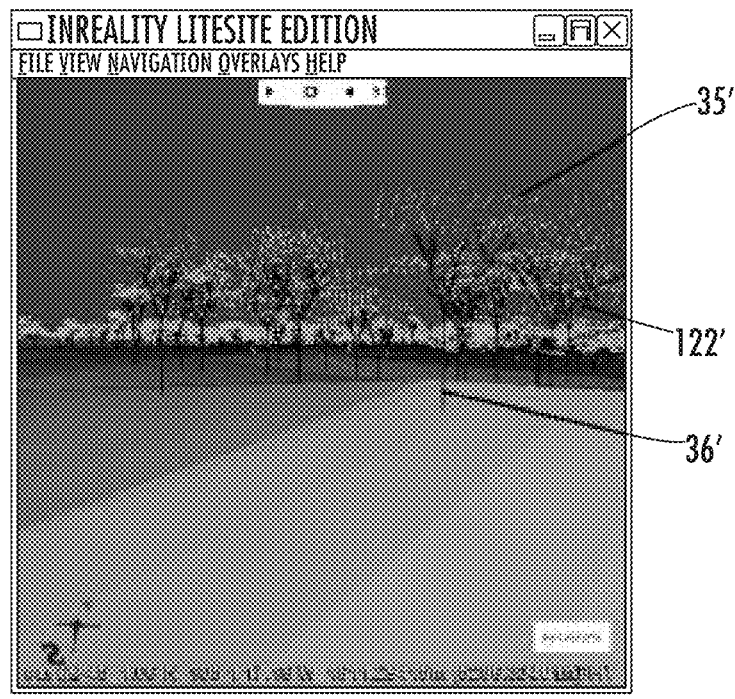
FIGS. 13 and 14 are digital elevation model views of a geospatial scene including trees with trunks and branches simulated in accordance with the present invention.
Figure 14:
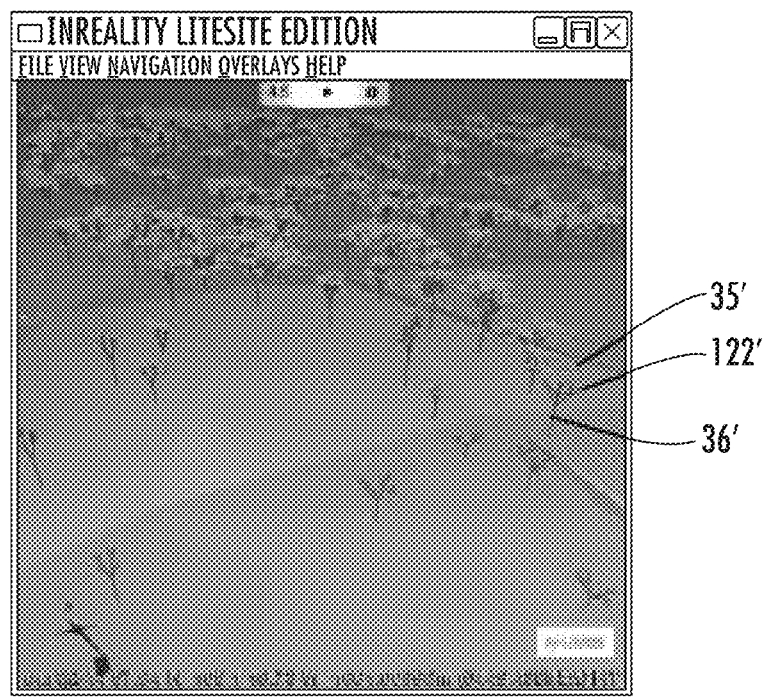
Figure 15:
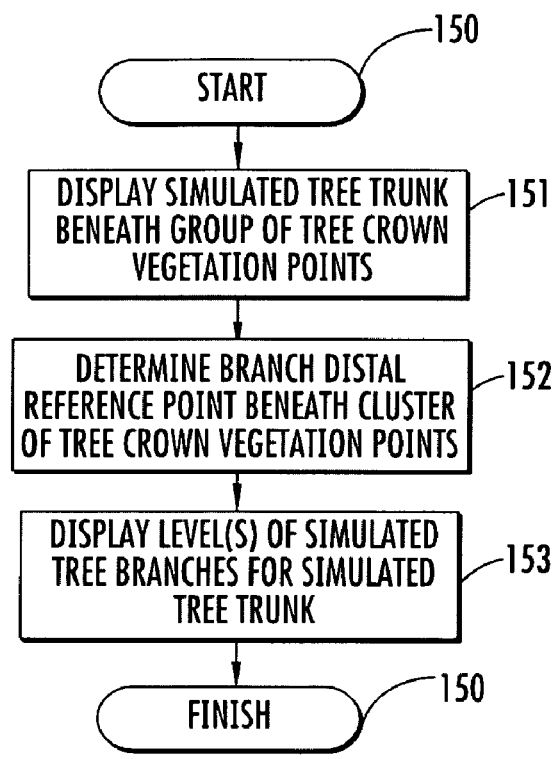
FIGS. 15 and 16 are flow diagrams illustrating method aspects for simulating tree trunks and branches in accordance with the present invention.

It should be noted that the embodiment illustrated in these figures is an artist rendering provided for illustrational purposes, and that these drawings are not actual simulated models from geospatial model data. Actual DEM views generated using the above-described approach are shown in FIGS. 13 (viewed from ground level) and 14 (viewed from above). In these figures, all of the trunk and branch widths are the same, and the leaves are displayed as vegetation points about the ends of the upper branches. These DEM views are screen shots generated using the InReality® viewer and LiteSite® geospatial modeling system from the Assignee Harris Corporation, although other suitable systems may also be used to implement the functions set forth above.

In some embodiments, the processor 22' may display vegetation texture (i.e., optical images or manual renderings of leaves, needles, etc.) at the endpoints of the simulated branches to provide an even more realistic appearance. Moreover, in some embodiments the processor 22' may optionally determine a tree type for the group of tree crown vegetation points from among a plurality of different tree types, at Block 169, and this information may be used to provide still further realistic looking tree trunk/branch structures, as well as vegetation textures.

By way of example, the processor 22' may determine the tree type to be one of a plurality of general tree types, such as coniferous trees, deciduous trees, evergreen trees, etc., although in some embodiments more specific types of trees (e.g., pine, fir, oak, etc.) could be determined. This classification may be done through the use of multi-spectral imagery and/or LIDAR/DEM textures. That is, the determination could be made in an automated fashion based upon a canopy point distribution of the group of tree crown vegetation points 35' (e.g., an inverted cone shape is an evergreen, an umbrella shape is deciduous, etc.). Alternatively, the tree type could be input by an operator, either on an individual level, or by designating the types of trees within a particular geographic region so that the processor 22' will automatically designate the trees to be of the given type that lie within the region.

For a given tree type, different numbers of branch levels, clusters, heights for upper end points, etc., may be used to more accurately reflect the appearance of the given tree. For example, evergreen trees may have pine needle vegetation texture overlayed thereon, while a deciduous tree may have leaf vegetation texture overlayed thereon. Moreover, the vegetation texture can be changed (or omitted) to reflect the trees at different times of the year (i.e., spring, summer, fall, or winter). Additionally, texture may also be applied to the trunk and/or branches of the trees, such as to resemble tree bark, for example. Again, this texture may also be "customized" for different tree types, if desired. In other words, the above-described approach is extendable to allow additional parameterization variables to more accurately simulate the actual trees present in a given geospatial scene, in addition to the size/spatial relationships thereof.

It should also be noted that the upper end points for one branch level need not always be the lower end points for the next level. For example, with an evergreen tree, it may be desirable to have each new vertical level of branches 122' extend outwardly from the trunk 36' at a point above the prior level. The method illustrated in FIG. 16 is concluded at Block 168.

The above-described system 20' and methods therefore advantageously provide a tree trunk and branch simulation approach that estimates tree structure that is unique to each individual group of tree crown vegetation points. Another particularly advantageous benefit of the present approach is that by determining endpoints for the trunk and branches, only these endpoints need to be stored to recreate that geospatial model. That is, the trunk and branch structures may advantageously be generated merely from the set of stored endpoints, which may significantly reduce the amount of data that needs to be stored for a given geospatial model. The above-described techniques may also be embodied in a computer-readable medium having computer-executable instructions for performing the above-noted steps.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A geospatial modeling system comprising:
    a geospatial model data storage device containing geospatial model data including a plurality of groups of tree crown vegetation points;
    a display; and
    a processor cooperating with said geospatial model data storage device and said display and configured to
        display a simulated tree trunk beneath a group of tree crown vegetation points, and
        display at least one level of simulated tree branches for the simulated tree trunk, each tree branch being positioned based upon determining a branch distal reference point beneath a cluster of tree crown vegetation points from among the group of tree crown vegetation points.

2. The geospatial modeling system of claim 1 wherein said processor is further configured to determine the branch distal reference points by dividing the group of tree crown vegetation points into a plurality of adjacent clusters of tree crown vegetation points.

3. The geospatial modeling system of claim 2 wherein said processor is configured to determine the branch distal reference points based upon calculating a centroid for each cluster of tree crown vegetation points.

4. The geospatial modeling system of claim 1 wherein said processor is configured to determine the branch distal reference points as upper branch endpoints.

5. The geospatial modeling system of claim 1 wherein said processor is further configured to determine branch proximal reference points based upon one of a preceding level and the simulated tree trunk.

6. The geospatial modeling system of claim 5 wherein said processor is further configured to determine the branch proximal reference points as lower branch endpoints.

7. The geospatial modeling system of claim 1 wherein said processor is configured to display a plurality of vertically arranged levels of simulated tree branches.

8. The geospatial modeling system of claim 1 wherein said processor is further configured to determine a tree type for the group of tree crown vegetation points from among a plurality of different tree types; and wherein said processor is configured to display the at least one level of simulated tree branches based upon the tree type.

9. The geospatial modeling system of claim 1 wherein said processor is further configured to display vegetation texture at endpoints of the simulated tree branches.

10. The geospatial modeling system of claim 1 wherein said processor is configured to display the simulated tree trunk to have a tree trunk height based upon heights of the group of tree crown vegetation points.

11. The geospatial modeling system of claim 10 wherein said processor is further configured to determine the tree trunk height by calculating a midpoint between ground and the group of tree crown vegetation points.

12. The geospatial modeling system of claim 1 wherein the geospatial model data comprises three-dimensional (3D) digital elevation model (DEM) data.

13. A geospatial modeling system comprising:
    a geospatial model data storage device containing geospatial model data including a plurality of groups of tree crown vegetation points; and
    a processor cooperating with said geospatial model data storage device and configured to
        simulate a tree trunk beneath a group of tree crown vegetation points, and
        simulate a plurality of vertically arranged levels of tree branches for the simulated tree trunk, each tree branch being positioned based upon determining a branch distal reference point beneath a cluster of tree crown vegetation points from among the group of tree crown vegetation points.

14. The geospatial model system of claim 13 wherein said processor is further configured to determine the branch distal reference points by dividing the group of tree crown vegetation points into a plurality of adjacent clusters of tree crown vegetation points.

15. The geospatial modeling system of claim 14 wherein said processor is configured to determine the branch distal reference points based upon calculating a centroid for each cluster of tree crown vegetation points.

16. The geospatial modeling system of claim 13 wherein said processor is configured to determine the branch distal reference points as upper branch endpoints.

17. The geospatial modeling system of claim 13 wherein said processor is further configured to determine a tree type for the group of tree crown vegetation points from among a plurality of different tree types; and wherein said processor is configured to display the at least one level of simulated tree branches based upon the tree type.

18. A geospatial modeling method comprising:
    providing geospatial model data including a plurality of groups of tree crown vegetation points;
    displaying a simulated tree trunk beneath a group of tree crown vegetation points on a display; and
    displaying at least one level of simulated tree branches for the simulated tree trunk on the display, each tree branch being positioned based upon determining a branch distal reference point beneath a cluster of tree crown vegetation points from among the group of tree crown vegetation points.

19. The method of claim 18 wherein determining the branch distal reference points comprises determining the branch distal reference points by dividing the group of tree crown vegetation points into a plurality of adjacent clusters of tree crown vegetation points.

20. The method of claim 19 wherein determining the branch distal reference points comprises determining the branch distal reference points based upon calculating a centroid for each cluster of tree crown vegetation points.

21. The method of claim 18 wherein determining the branch distal reference points comprises determining the branch distal reference points as upper branch endpoints.

22. The method of claim 18 wherein displaying the at least one level of simulated tree branches comprises displaying a plurality of vertically arranged levels of simulated tree branches.

23. The method of claim 18 further comprising determining a tree type for the group of tree crown vegetation points from among a plurality of different tree types; and wherein displaying the at least one level of simulated tree branches comprises displaying the at least one level of simulated tree branches based upon the tree type.

24. A non-transitory computer-readable medium having computer executable instructions for causing a computer to perform steps comprising:
providing geospatial model data including a plurality of groups of tree crown vegetation points;
displaying a simulated tree trunk beneath a group of tree crown vegetation points on a display; and
displaying at least one level of simulated tree branches for the simulated tree trunk on the display, each tree branch being positioned based upon determining a branch distal reference point beneath a cluster of tree crown vegetation points from among the group of tree crown vegetation points.

25. The non-transitory computer-readable medium of claim 24 wherein determining the branch distal reference points comprises determining the branch distal reference points by dividing the group of tree crown vegetation points into a plurality of adjacent clusters of tree crown vegetation points.

26. The non-transitory computer-readable medium of claim 25 wherein determining the branch distal reference points comprises determining the branch distal reference points based upon calculating a centroid for each cluster of tree crown vegetation points.

27. The non-transitory computer-readable medium of claim 24 wherein determining the branch distal reference points comprises determining the branch distal reference points as upper branch endpoints.

28. The non-transitory computer-readable medium of claim 24 wherein displaying the at least one level of simulated tree branches comprises displaying a plurality of vertically arranged levels of simulated tree branches.

29. The non-transitory computer-readable medium of claim 24 further having computer executable instructions for causing the computer to determine a tree type for the group of tree crown vegetation points from among a plurality of different tree types; and wherein displaying the at least one level of simulated tree branches comprises displaying the at least one level of simulated tree branches based upon the tree type.

* * * * *